FIELD STRENGTHS

A      0 VOLTS/CM
B    225 VOLTS/CM
C   5000 VOLTS/CM
D  15000 VOLTS/CM
E  24000 VOLTS/CM

Marcella C. Petree
Robert W. Warfield
INVENTORS 3,321,391
METHOD FOR STUDYING EFFECTS OF POLYMERIZATION IN D.C. ELECTRIC FIELD Robert W. Warfield, Germantown, and Marcella C. Petree, Silver Spring, Md., assignors to the United States of America as represented by the Secretary of the Navy
Filed Dec. 4, 1963, Ser. No. 328,138
4 Claims. (Cl. 204—165)

The invention described herein may be manufactured and used by or for the Government of the United States of America for governmental purposes without the payment of any royalties thereon or therefor.

This invention relates to the analysis of the structure of polymeric material and more particularly to a nondestructive method for determining the effect of the application of a strong electric field to the polymer during polymerization and the extent of any such effect.

It has been found by the present inventors that the application of relatively high D.C. electric fields during the polymerization of some polymers produces alignment or orientation of the polymer structure. The mechanism by which this happens is not fully understood, but is thought to depend on the presence in the polymer of electrical dipoles which can respond directionally to the applied field. The inventors have also found that the temperature dependence of the electrical resistivity of an oriented polymer is less than that of an unoriented polymer and that the magnitude of the decrease is an accurate index of the extent of the orientation. The test method hereinafter set out is based on these discoveries.

An object of the present invention is to provide a nondestructive method of determining whether or not the structure of a polymer is changed when the polymer is polymerized in a strong D.C. electric field, and further to determine the magnitude of any change which does take place. A further object is to provide such a method which is efficient and can be easily carried out.

Figure 1:
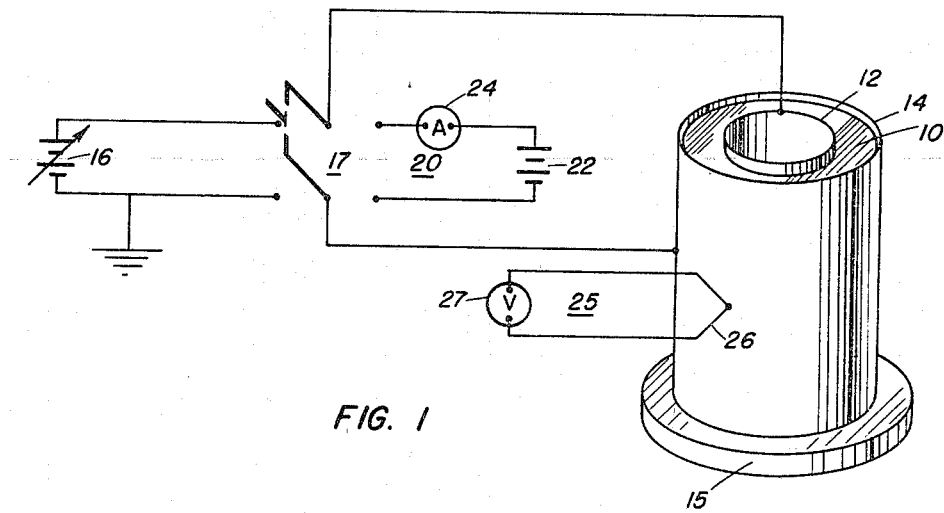
Figure 2:
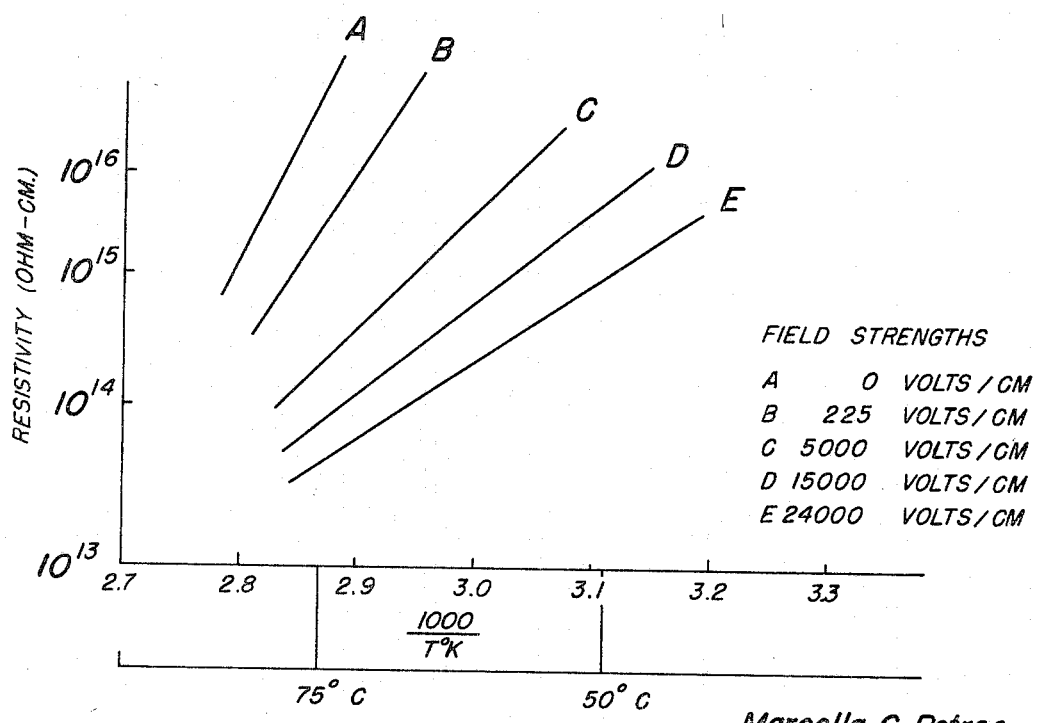

Other objects and advantages of the invention will become apparent from the following description including the accompanying drawings, wherein:

FIG. 1 is a schematic diagram of the apparatus used to perform the method of the invention; and FIG. 2 is a semi-logarithmic plot of resistivity against reciprocal temperature for a series of polymers polymerized at four different field strengths as well as a polymer polymerized with no applied field at all.

Referring now to FIG. 1, apparatus for both carrying out the polymerization and making the subsequent tests is there diagrammatically shown. The material 10 to be studied, in the form of a liquid starting material, is placed between a pair of electrodes which, in the preferred embodiment of the apparatus, take the form of concentric cylinders 12 and 14 supported and closed at their lower end by means of a base 15 made of insulating material. For the purpose of supplying a strong D.C. electric field during polymerization, a calibrated variable D.C. power supply 16, capable of providing a high D.C. voltage, is connected through a double pole double throw switch 17 directly across the electrodes and serves to establish a radial electric field therebetween.

For measuring the resistivity of the sample, a measuring circuit 20, including a battery 22 and a current meter 24 may selectively be coupled to electrodes 12 and 14 through switch 17. The temperature of the sample itself is measured by a thermocouple circuit 25, the sensitive element 26 of which is preferably taped to the outside of electrode 14. A voltmeter 27 indicates the output of the thermocouple.

The cylindrical electrodes have the particular advantage of confining all of the material to be studied in a region of substantially uniform electric field strength, as well as providing a convenient container for the material in its liquid unpolymerized state. Moreover, by polymerizing the material while in contact with the electrodes, extremely good electrical connection with the polymer is obtained.

Polymerization is conducted isothermally in a temperature controlled environment provided by an oven. For convenience, this apparatus is not shown in the drawing; but it is entirely conventional, involving an oven and a controllable heater therefor as will be readily understood by those skilled in the art. In carrying out the polymerization, power supply 16 is set to provide the desired field strength and the oven temperature is established at the desired value. Polymerization is allowed to proceed to completion, and thereafter the test method of the invention is performed.

As briefly mentioned above, the test method of the invention is based on the discovery that the temperature dependence of the electrical resistivity of an oriented polymer is less than that of an unoriented polymer. The present method is simply to measure the temperature dependence of the resistivity of the sample and to compare the result with the temperature dependence exhibited by a control sample of the polymer which has been polymerized in the absence of an applied electric field.

The measurement of the temperature dependence of the resistivity of the sample is most conveniently carried out in the following manner. After completion of the polymerization, switch 17 is moved to the test position, putting battery 22 across the electrodes. Battery 22 provides a voltage sufficiently low such that measurement itself does not affect the orientation of the sample. A field in the polymer of about 200 volts/cm. is suitable. The heat input to the oven is then removed, the oven door is opened, and the sample is permitted to cool down slowly. Periodically during the cooling, ammeter 24 and voltmeter 27 are read. The resistivity of the sample is calculated from the current and voltage information, and from the known dimensions of the electrodes, in conventional manner. Finally, after sufficient data has been obtained, the resistivity values are plotted against the reciprocal of absolute temperature as derived from thermocouple circuit 25 and a plot such as is shown in FIG. 2 is obtained.

FIG. 2 is provided as a qualitative example of the results obtained when a typical orientable polymer was tested in accordance with the above teachings. The starting material employed consisted of 30% styrene and 70% of a linear condensation polymer of maleic and phthalic acids with propylene glycol. A source of free radicals consisting of 1% methyl ethyl ketone peroxide was also supplied. Polymerization was carried out at $0° \pm 2°$ C. and at various field strengths from 0 to 25,000 v./cm., the range productive of orientation being from 125 to 25,000 v./cm. Straight line curves A, B, C, D and E of FIG. 2 are representative of the results, curve A showing the temperature dependence of the resistivity of the polymer when polymerized with no field applied, while curves B, C, D and E show the temperature dependence when the polymer was polymerized at 225 v./cm., 5,000 v./cm., 15,000 v./cm. and 24,000 v./cm. respectively. It is to be noted that the slope of these curves decreases with increasing field strength. Because it is known, as set forth above, that an oriented polymer exhibits a lower temperature dependence of resistivity than an unoriented polymer, it obviously follows that the curves of FIG. 2 show the polymer in various degrees of orientation. The conclusion is that the extent of orientation is directly shown by the magnitude of the difference in slope of the temperature dependence curves. Of course, if no such difference appears, the indication would be that the polymer had not been oriented.

Obviously many modifications and variations of the invention are possible in the light of the above teachings. It is therefore to be understood that within the scope of the appended claims the invention may be practiced otherwise than is specifically described.

What is claimed is:

1. A method of determining the extent of orientation of a polymer which has been polymerized in a strong electric field comprising the steps of:

carrying out said polymerization with the polymer contained between a pair of electrodes, after polymerization is complete, applying a relatively low voltage across said electrodes to establish an electric field in said polymer, measuuring the current through said polymer as a measure of the resistivity thereof, varying the temperature of said polymer and measuring the resistivity thereof at a plurality of temperatures, plotting the resistivity values against the reciprocal temperature to obtain a straight line, the slope of which will be less for an oriented than for an unoriented polymer.

2. A method as in claim 1 wherein the polymerization step is carried out isothermally at an elevated temperature in a temperature controlled oven, and the temperature variation is achieved by turning off the oven and allowing the polymer to cool.

3. A method of determining the extent of orientation of a polymer which has been made by placing a polymerizable liquid starting material between a pair of electrodes in a temperature controlled environment, establishing a strong D.C. electric field in the material by imposing a high D.C. voltage across said electrodes, and establishing an elevated temperature in said environment, thereby polymerizing said material, comprising the steps of:

after polymerization is complete, varying the temperature of said material and measuring the electrical resistivity of said material for a plurality of different temperatures, plotting the obtained resistivity values against the reciprocal of absolute temperature to obtain a straight line curve, the slope of which is representative of the temperature dependence of the resistivity of said material, and comparing the slope of the curve so obtained, wtih the slope of the curve obtained when the same material is polymerized in the absence of an applied electric field.

4. A method as in claim 3 wherein the applied electric field is within the range of 125 to 25,000 volts/cm.

References Cited by the Examiner

FOREIGN PATENTS 15,313    5/1962    Israel.
591,986    1/1957    Italy.

JOHN H. MACK, *Primary Examiner.*

R. K. MIHALEK, *Assistant Examiner.*